(12) United States Patent
Harris

(10) Patent No.: US 7,248,390 B2
(45) Date of Patent: Jul. 24, 2007

(54) LIGHT SCANNING DEVICE

(75) Inventor: Martin Russell Harris, Windsor (AU)

(73) Assignees: PENTAX Corporation, Tokyo (JP);
OPTISCAN PTY, Ltd., Notting Hill, Victoria (AU)

( * ) Notice: Subject to any disclaimer, the term of this patent is extended or adjusted under 35 U.S.C. 154(b) by 76 days.

(21) Appl. No.: 10/508,541

(22) PCT Filed: Mar. 26, 2003

(86) PCT No.: PCT/AU03/00379

§ 371 (c)(1),
(2), (4) Date: Sep. 27, 2004

(87) PCT Pub. No.: WO03/081318

PCT Pub. Date: Oct. 2, 2003

(65) Prior Publication Data
US 2005/0162722 A1 Jul. 28, 2005

Related U.S. Application Data

(60) Provisional application No. 60/367,270, filed on Mar. 26, 2002.

(51) Int. Cl.
*G02B 26/08* (2006.01)

(52) U.S. Cl. ...................................... 359/198; 359/224

(58) Field of Classification Search ................ 359/212, 359/213, 214, 196, 197, 198, 199, 200, 201
See application file for complete search history.

(56) References Cited

U.S. PATENT DOCUMENTS

| 3,952,217 | A | * | 4/1976 | Rawlings ..................... 310/36 |
| 4,902,083 | A | | 2/1990 | Wells |
| 5,210,636 | A | | 5/1993 | Baer |
| 5,995,264 | A | | 11/1999 | Melville |
| 6,057,952 | A | | 5/2000 | Kubo et al. |
| 6,107,770 | A | | 8/2000 | Jackson et al. |
| 6,122,089 | A | * | 9/2000 | Minamoto et al. .......... 359/198 |
| 6,172,789 | B1 | * | 1/2001 | Kino et al. ................. 359/212 |

FOREIGN PATENT DOCUMENTS

| DE | 4001242 | 7/1991 |
| GB | 1457995 | 12/1976 |
| WO | 99/04301 | 1/1999 |

* cited by examiner

*Primary Examiner*—Euncha P. Cherry
(74) *Attorney, Agent, or Firm*—Greenblum & Bernstein, P.L.C.

(57) ABSTRACT

The invention provides a light scanning device for scanning light from a light source, the light scanning device having: a pivotably mounted mirror for receiving light from the light source; a counterbalance; and a drive for oscillatorily pivoting the mirror and the counterbalance simultaneously in opposite directions to reduce uncoupled forces.

22 Claims, 7 Drawing Sheets

LIGHT SCANNING DEVICE

CROSS-REFERENCE TO RELATED APPLICATIONS

This application claims the benefit of U.S. Provisional Application No. 60/367,270, filed Mar. 26, 2002.

FIELD OF THE INVENTION

The present invention relates to a light scanning device, of particular but by no means exclusive application in the fields of scanning microscopy and scanning endoscopy.

One existing scanning microscope is disclosed in International Patent Application No. WO 99/04301. This microscope employs a miniature tuning fork to one tine of which is attached an optical fiber light source. The tuning fork is driven by electromagnets at a frequency of approximately 1000 Hz so that the output of the optical fiber is scanned in the direction of vibration of the tuning fork.

Another technique is disclosed in related U.S. Pat. Nos. 6,172,789 and 6,057,952. The system disclosed in these documents includes a moveable mirror, a fixed mirror and a converging lens. The moveable mirror has an opening at its centre and is supported to be swingable about at least one axis. The fixed mirror is fixedly supported by an optically transparent plate, with its reflection surface opposed to that of the moveable mirror. Light is admitted from the end of an optical fiber, through the opening in the centre of the moveable mirror and reflected from the fixed mirror towards the moveable mirror. Light is then reflected from the moveable mirror towards the converging lens, which focuses the light on to an object surface. The moveable mirror is swung in an oscillatory manner about a central axis by means of an electrostatic drive; input light reflected from the fixed mirror onto the moveable mirror is thereby scanned by the moveable mirror upon reflection therefrom.

In many applications, however, it is important to minimize the loss of energy of vibration from the fast scanning elements. Some prior art devices, being small or in miniature form, have light and the vibrating elements that make up a substantial proportion of their mass. Thus a considerable amount of reactive motion of the shell or case of such devices can occur. While operating, contact between the case of such devices and biological tissue can cause a high and variable degree of mechanical damping. In engineering terms the "Q" of these systems will be substantially reduced. This damping may also make the oscillation of a fast scan mirror difficult to maintain or may cause substantial changes in the amplitude of vibration.

As a separate effect, the coupling of vibrational energy from a fast resonant scan mirror may also cause unwanted vibration of other components in a scanning head. Such vibration may have deleterious effects.

SUMMARY OF THE INVENTION

The present invention provides, therefore, a light scanning device for scanning light from a light source, said light scanning device having:
  a pivotably mounted mirror for receiving light from said light source;
  a counterbalance; and
  a drive for oscillatorily pivoting said mirror and said counterbalance simultaneously in opposite directions to reduce uncoupled forces.

Thus, in applications such as endoscopy where such a device would be located in an optical head, vibration or other uncoupled forces resulting from pivoting the mirror can be reduced, so that the transmission of vibration to the optical head can be reduced. The drive is used to pivot the mirror, so that light reflected from the mirror can be scanned. Such applications commonly have two scanning directions, that is, a slow y-axis or vertical scan and a fast x-axis or horizontal scan. It is envisaged that the invention would generally be employed to provide the latter (viz. fast) scan, but there is no reason why, in principal, it could not be used for slower scans. The benefits of the invention would generally diminish, however, with the scan rate.

Preferably said device includes a torsion bar for supporting said mirror. More preferably said torsion bar comprises a filament.

Preferably said counterbalance is mechanically coupled to said mirror. More preferably said device includes a torsion bar for supporting said mirror and said counterbalance, wherein said drive drives said counterbalance by driving said mirror and thereby said mechanically coupled counterbalance.

The counterbalance may comprise a plurality of counterbalancing elements. In one embodiment said counterbalance comprises two counterbalancing elements, located at opposite sides of said mirror. In another embodiment, said counterbalance comprises an annular structure locatable around said mirror.

In one embodiment, said mirror and said counterbalance are coupled electrostatically or electromagnetically.

Preferably said drive is an electrostatic drive. In another embodiment said drive is an electromagnetic drive.

In another embodiment said mirror and said counterbalance are located, respectively, on first and second supports, wherein said counterbalance is located behind said mirror and thereby does not obscure the light receiving face of said mirror.

Thus, in this configuration the device can be narrower as the counterbalance is not located beside the mirror.

Preferably said device has a housing containing a reduced atmosphere so that said mirror and said counterbalance operate in said reduced atmosphere.

The present invention also provides a method of scanning light, comprising:
  reflecting said light from a mirror;
  driving said mirror so as to oscillatorily pivot said mirror and thereby scan said light reflected from said mirror; and
  driving a counterbalance to act as a counterbalance to said mirror;
  whereby uncoupled forces due to said pivoting of said mirror are reduced by means of said counterbalance.

According to another aspect, the present invention provides a scanning microscope or endoscope including the light scanning device described above.

Preferably the microscope or endoscope includes one or more optical fibers for transmitting incident light to said microscope or endoscope, for transmitting return light from a sample, or for both transmitting incident light to said microscope or endoscope and for transmitting return light from a sample.

The microscope or endoscope may be a confocal microscope or endoscope.

According to another aspect of the invention, there is provided a method of balancing a light scanning device as described above, comprising:

mounting said mirror and counterbalance on one or more sensors for detecting vibration in said device in one or more dimensions;

operating said device and monitoring by means of said sensors any vibration therein; and adjusting said device so as to reduce any vibration therein.

Preferably adjusting said device comprises ablating a portion of said counterbalance or a portion of said mirror, or ablating portions of both said counterbalance and said mirror.

Preferably said ablating is laser ablating.

Preferably said ablating is performed in a reduced atmosphere.

BRIEF DESCRIPTION OF THE DRAWINGS

In order that the present invention may be more clearly ascertained, the preferred embodiments will now be described, by way of example, by reference to the accompanying drawings, in which.

DETAILED DESCRIPTION OF THE PREFERRED EMBODIMENTS

Figure 1A:
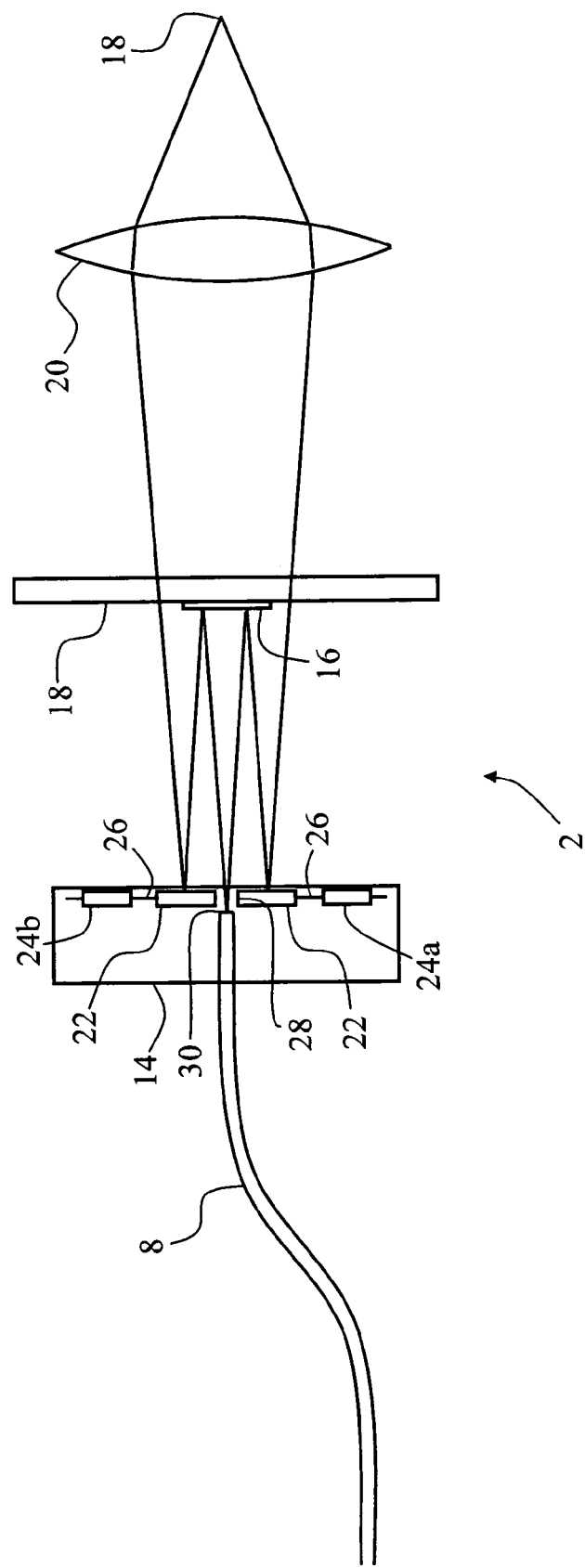
FIG. 1A is a schematic view of a light scanning device according to a first embodiment of the present invention.

A light scanning device in accordance with the first preferred embodiment of the present invention is shown generally at 2 in FIG. 1A, in use with an optical fiber 8. The light scanning device 2 includes a scanning element 14, a fixed, plane mirror 16 supported on a transparent plate 18 at a converging lens 20.

The scanning element 14 includes a plane, pivotable mirror 22, with a reflecting surface facing the reflecting surface of fixed mirror 16. Pivotable mirror 22 is flanked by a counterbalance comprising twin counterbalancing elements 24a, 24b, one each side of pivotable mirror 22. Pivotable mirror 22 and counterbalancing elements 24a, 24b are mounted on silicon torsion bar 26.

Pivotable mirror 22 has a central, circular aperture 28, which coincides with tip 30 of optical fiber 8, so that light emitted from optical fiber 8 can pass unimpeded through aperture 28 in pivotable mirror 22. The diameter of circular aperture 28 is thus greater than that of optical fiber 8, so that the central aperture 28 does not act a spatial filter for outgoing or returning light. Similarly, return light can be received by tip 30 of optical fiber 8 after passing through aperture 28 in pivotable mirror 22.

In use, light from a suitable source (not shown), generally a laser source, is transmitted along optical fiber 8 towards tip 30, and emitted from tip 30 and through circular, central aperture 28 of pivotable mirror 22 towards fixed mirror 16. This light is reflected from fixed mirror 16 towards pivotable mirror 22, and reflected by pivotable mirror 22 towards converging lens 20. In this process, as will be appreciated, some light may be lost through reflection from fixed mirror 16 back into central aperture 28 or otherwise.

The light that reaches converging lens 20 is converged towards point 18, at which will be located a sample. Similarly, light returned by that sample (whether by reflection or fluorescence), which will be collected by converging lens 20 and returned along the same optical path to tip 30 of optical fiber 8. By suitable beam splitting techniques, this return light—or a portion thereof—can then be directed to a detector (not shown).

Though not shown in FIG. 1A, scanning element 14 includes an electrostatic drive for pivoting pivotable mirror 22 about torsion bar 26 in an oscillatory fashion, so that light reflected from pivotable mirror 22 is scanned (in the view shown in FIG. 1A) in and out of the plane of the figure. Counterbalancing elements 24a and 24b are also pivoted, but 180° out of phase with the motion of pivotable mirror 22, to thereby provide a counterbalancing effect.

Figure 1B:
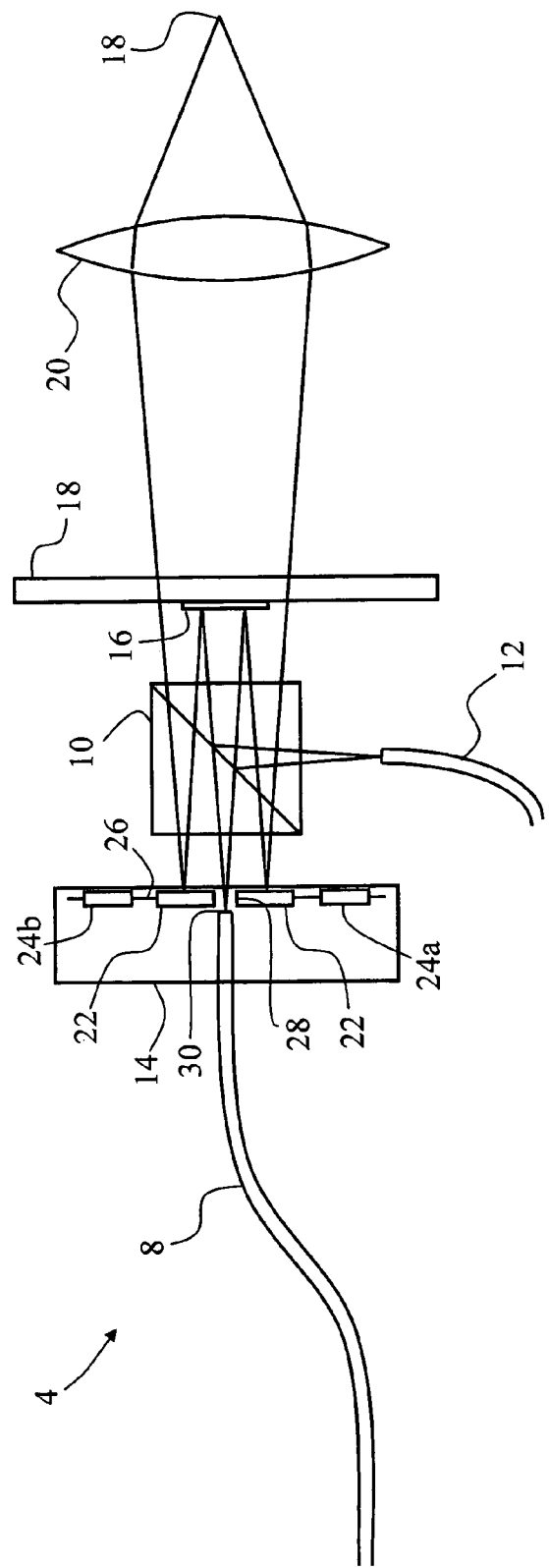
FIG. 1B is a schematic view of a variation of the light scanning device of FIG. 1A.

A variation of the light scanning device 2 is shown generally at 4 in FIG. 1B, again in use with optical fiber 8. Though in most respects identical with scanning device 2 of FIG. 1A, scanning device 4 includes a beamsplitter 10 to divert return light through 90° into return fiber 12 (connected to a suitable light detector, not shown).

Another variation of the light scanning device 2 is shown generally at 6 in FIG. 1C, again in use with optical fiber 8. In this variation, the tip 30 of optical fiber 8 is located within (or, optionally, marginally forward of) central aperture 28 of the scanning device 6. The central aperture 28 has, in this variation, a slightly larger diameter than in the variations shown in FIGS. 1A and 1B, so that the fiber 8 can be accommodated—including when the mirror 22 is, in use, pivoting—without interfering with the motion of the mirror 22.

In still another variation of the scanning device 2, a second (return) fiber is located adjacent to optical fiber 8 and the scanning device 2 includes an additional optical element located either between scanning element 14 and plate 18 or between plate 18 and converging lens 20 for diverging light returning from the sample by a small amount. This returning light is therefore collected by the second fiber rather than by fiber 8, thereby avoiding the need provide fiber 8 with a beamsplitter for directing return light out of fiber 8 and towards a detector.

Figure 2:
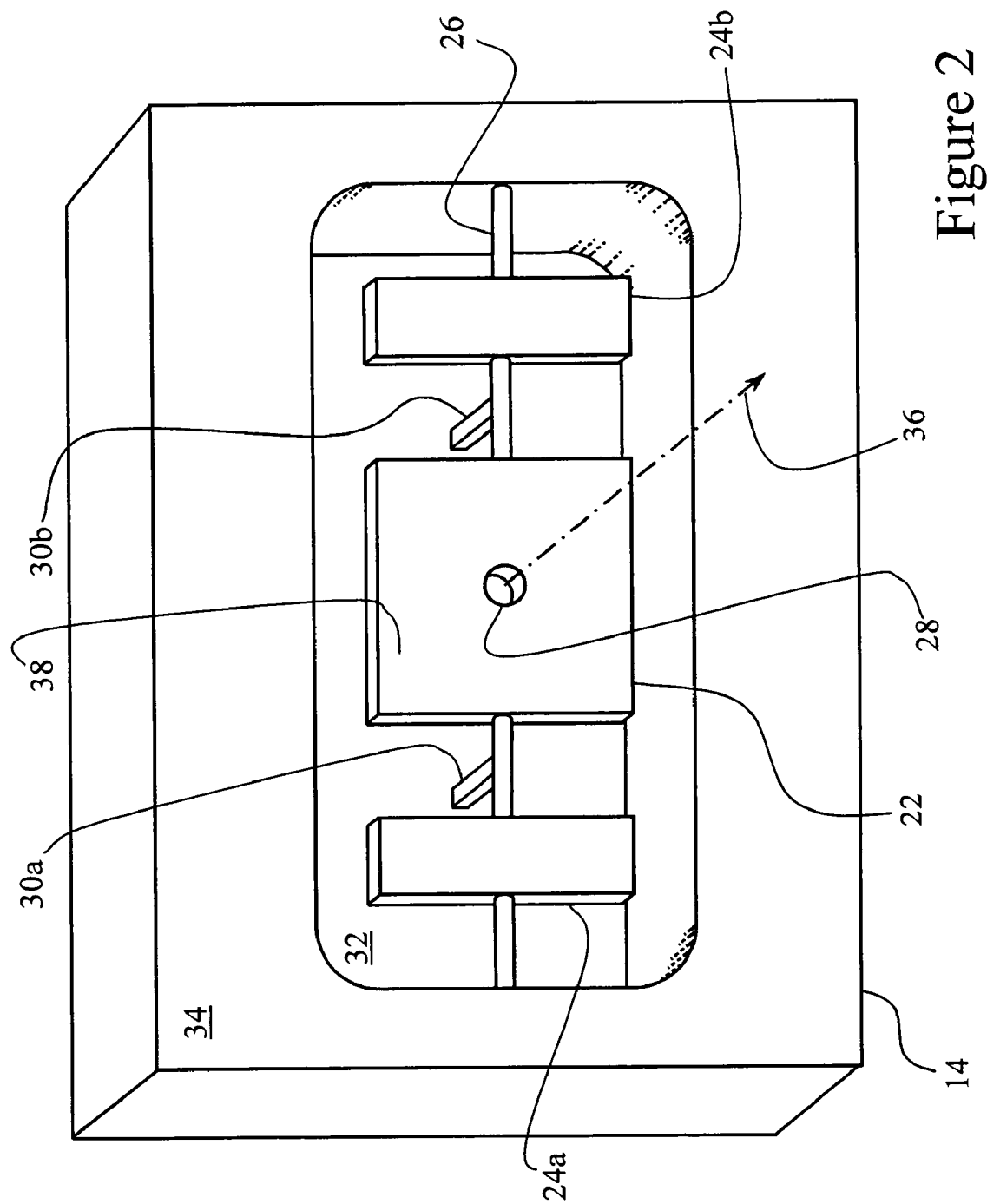
FIG. 2 is a view of the scanning element of the light scanning device of FIG. 1A.

The scanning element 14 is shown in greater detail in FIG. 2. Also visible in this figure are silicon microfabricated support pillars 30a and 30b extending from the rear wall 32 of frame 34 of scanning element 14 to torsion bar 26, and located between mirror 22 and, respectively, counterbalancing element 24a and counterbalancing element 24b. Support pillars 30a and 30b are provided to inhibit waves from being induced in torsion bar 26 by the motion of mirror 22 and counterbalancing elements 24a and 24b.

Light from optical fiber 8 (not shown) is emitted through central aperture 28 in direction 36.

The electromagnetic drive can assume any suitable form, including that taught in U.S. Pat. Nos. 6,057,952 and 6,172,789. That being the case, the reflective surface 38 of mirror 22 may be in the form of an applied conducting and reflective material to act both as an electrode and a reflector.

Another suitable, alternative drive comprises an electromagnetic drive, comparable to that disclosed in WO 99/04301.

As will be appreciated, counterbalancing elements 24a and 24b are designed to precisely counterbalance the mirror 22 to minimize the coupling of uncoupled forces being transmitted to frame 34 and from there to whatever optical head contains the device 2. Counterbalancing elements 24a and 24b can be driven out of phase with mirror 22 in at least two ways. Firstly, they can be driven by the electrostatic drive that drives mirror 22, but out of phase with mirror 22. Alternatively, the electrostatic drive can be used to drive mirror 22 and, through the mechanical coupling of mirror 22 and counterbalancing elements 24a and 24b via torsion bar 26, also to drive counterbalancing elements 24a and 24b. In either case, however, the drive drives both the mirror 22 and the counterbalancing elements 24a and 24b.

Mirror 22 and counterbalancing elements 24a and 24b are driven with a resonant oscillatory motion, as will be understood by those in the art. The system has a high Q value, so that as little energy as possible must be input to sustain the oscillation. The scanning device 2 is provided with a lock-in sensor (not shown) which, in conjunction with the drive, enables the mirror 22 and counterbalancing elements 24a and 24b to be driven and maintained at the resonant frequency.

The scanning device 2 is constructed within a case or optical head (not shown) such that mirror 22 is contained within a reduced pressure atmosphere, having a pressure lower than atmospheric pressure. This reduces the resistance of the atmosphere to the motion of the mirror 22 and the counterbalancing elements 24a and 24b, but more generally the sealed optical head makes the elements contained therein less vulnerable to contamination from moisture, oil or dust. Indeed, in one embodiment a transparent seal is located over the converging lens 20; this seal can be cleaned without the risk of damaging the focusing optics provided by converging lens 20.

Figure 3A:
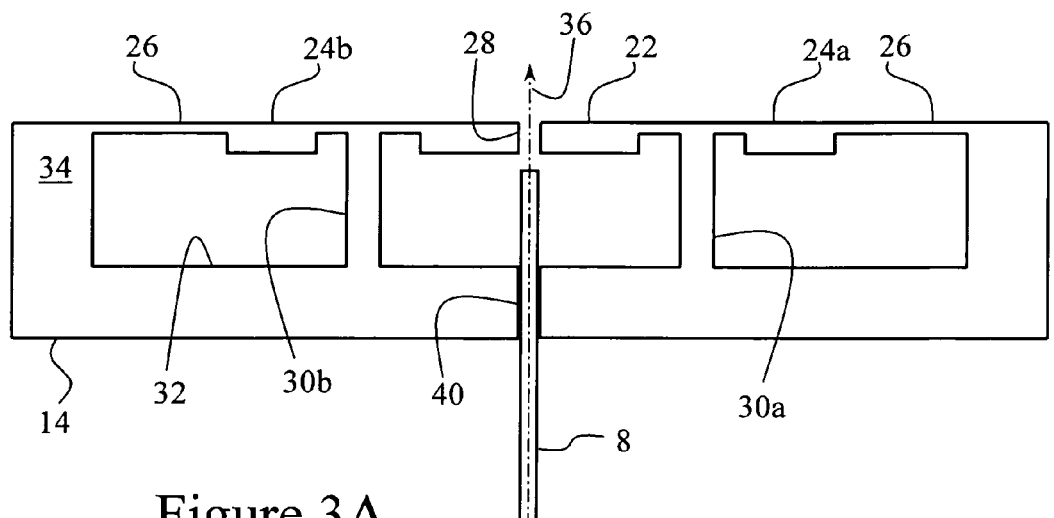
FIG. 3A is a cross-sectional view of the scanning element of FIGS. 1A and 2.

FIG. 3A is a cross-sectional plan view of scanning element 14, in which may be seen mirror 22, counterbalancing elements 24a and 24b, torsion bar 26, support pillars 30a and 30b, and optical fiber 8. As is apparent from this view, optical fiber 8 is secured within an aperture 40 in rear wall 32 of the frame 34 of scanning element 14. Aperture 40 is aligned with central aperture 28 of mirror 22. Optical fiber 8 may, optionally, be additionally supported if necessary, such as with a collar extending from rear wall 32 towards central aperture 28. Optical fiber 8 extends as far towards central aperture 28 as possible, without interfering with the pivoting motion of mirror 22.

Figure 1C:
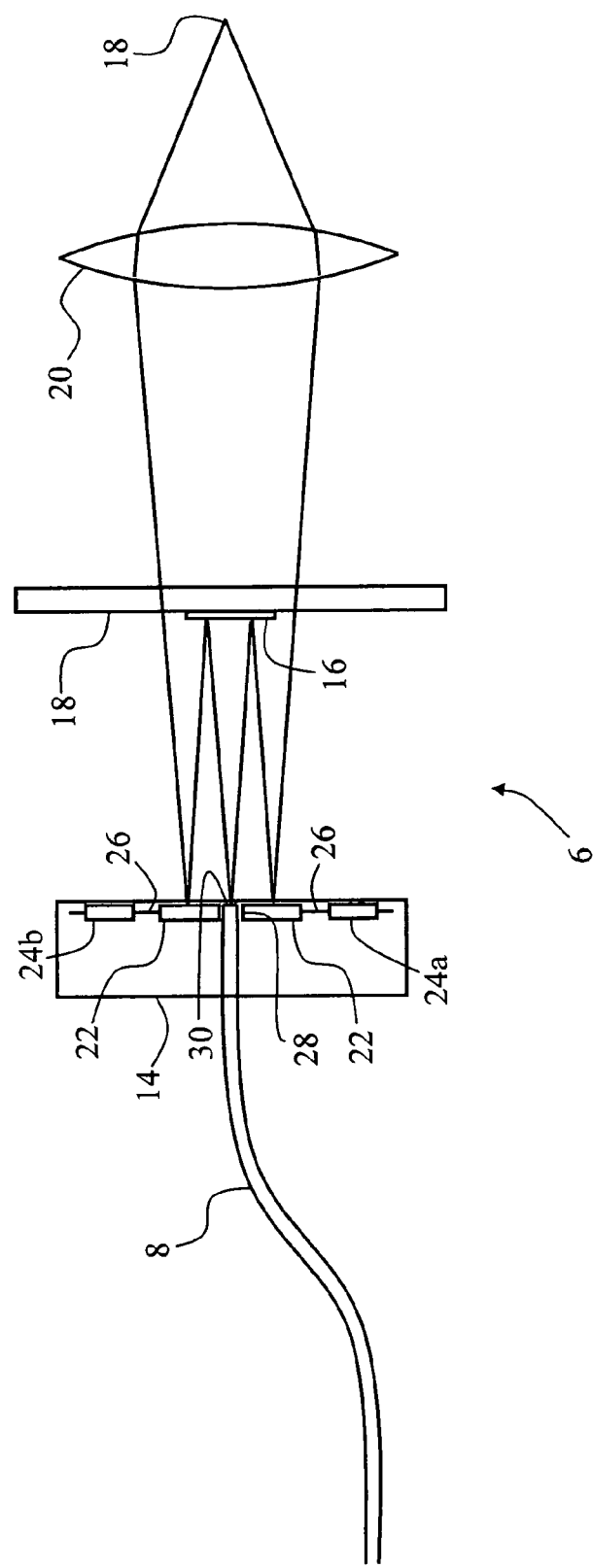
FIG. 1C is a schematic view of a further variation of the light scanning device of FIG. 1A.
Figure 3B:
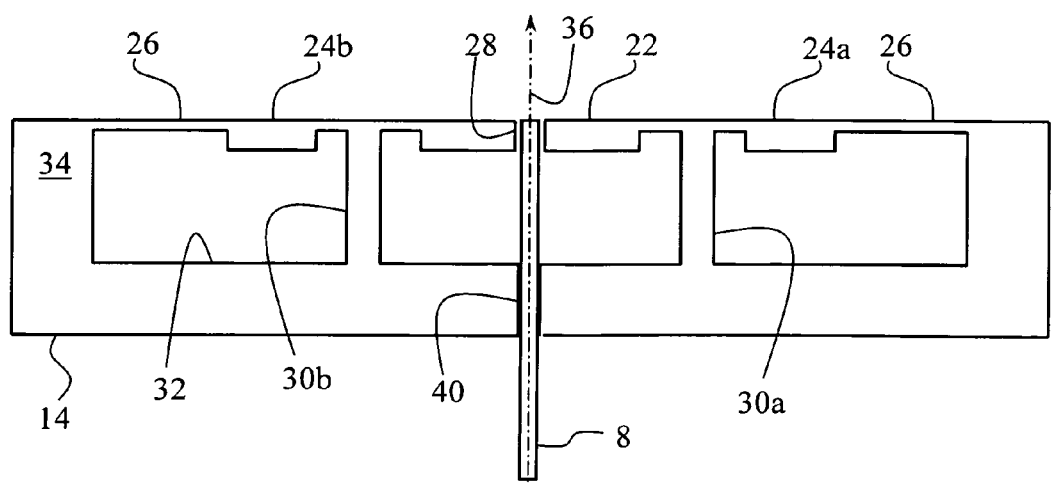
FIG. 3B is a cross-sectional view of the scanning element of FIGS. 1C and 2.

FIG. 3B is similar to FIG. 3A, but illustrates scanning element 14 according to the variation shown in FIG. 1C, that is, with a somewhat larger central aperture 28 to accommodate fiber 8.

Figure 4:
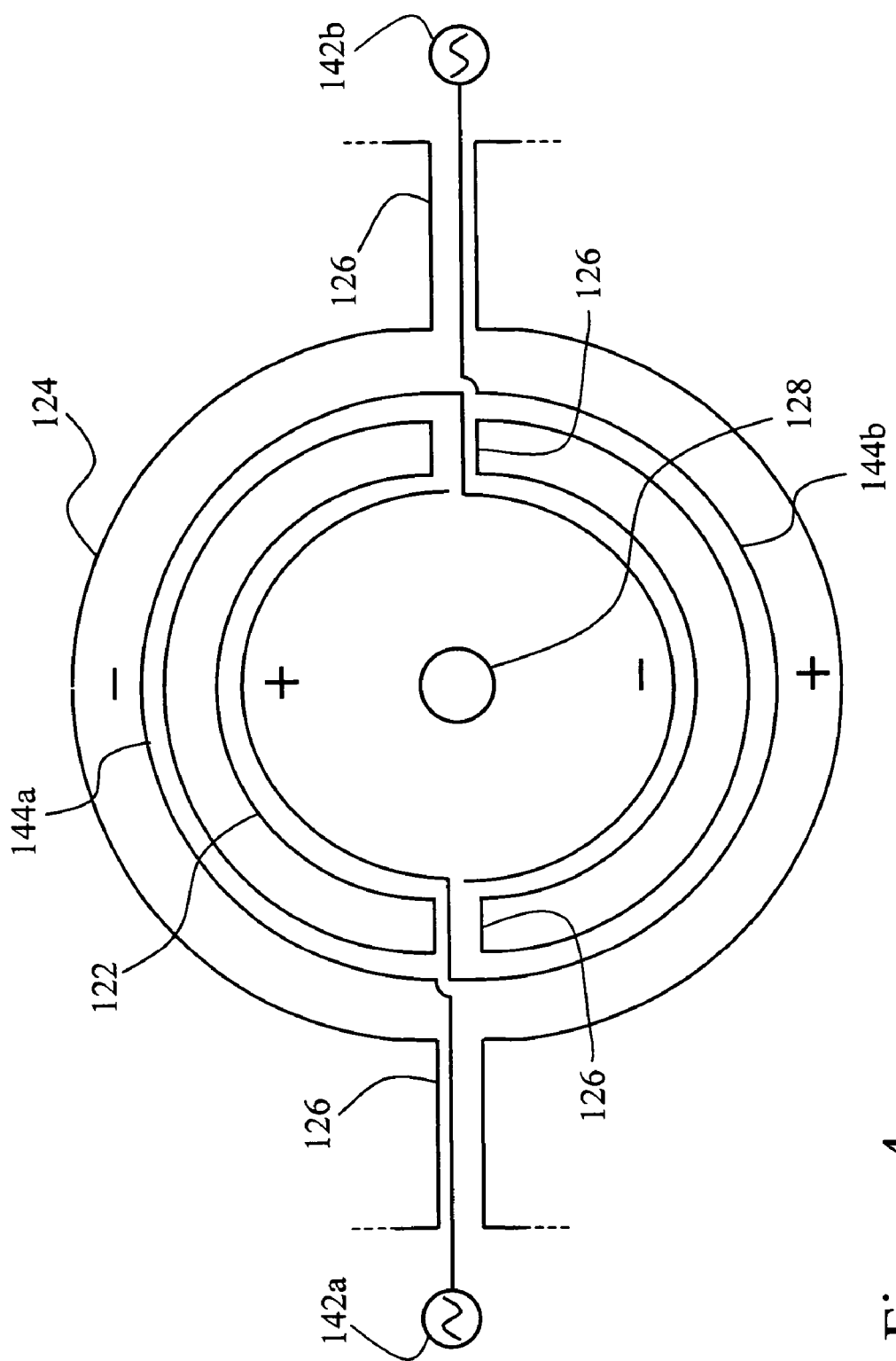
FIG. 4 is a view, similar to that of FIG. 2, of a light scanning element according to a second embodiment of the present invention.

Referring to FIG. 4, according to a second preferred embodiment of the present invention the scanning element is substantially identical to that shown in FIG. 2, but with an essentially circular mirror 122 and with a counterbalance in the form of a single counterbalancing element 124 comprising an annular element located so as to surround mirror 122, co-centered with the mirror 122. This arrangement has a number of benefits: the counterbalancing element 124, as it surrounds mirror 122, has a significant portion of its mass located further from torsion bar 126 than does mirror 122 itself. Consequently, the moment of inertia of counterbalancing element 124 is relatively high for its mass, compared with that of counterbalancing elements 24a and 24b of FIGS. 1 to 3. Consequently, the same degree of counterbalancing can be provided by counterbalancing element 124 for a relatively lesser mass, so that the overall scanning element can be less massive. Mirror 122 has a central, circular aperture 128, comparable to circular aperture 28 of mirror 22 of FIG. 1A.

In this embodiment, silicon microfabricated support pillars may also be provided behind (in the view of FIG. 4) torsion bar 126, between mirror 122 and counterbalancing element 124.

The scanning element of the second embodiment is also provided with an electrostatic drive, shown schematically in FIG. 4. The electrostatic drive comprises two alternating power supplies 142a and 142b, each connected to electrodes 144a and 144b respectively and attached to the mirror 122 and counterbalancing element 124 in the following manner.

Electrode 144a extends from power supply 142a, proceeds along torsion bar 126 to counterbalancing element 124, then around counterbalancing element 124 in approximately a semicircle until it again reaches torsion bar 126, follows torsion bar 126 to mirror 122, and passes around the periphery of mirror 122 in approximately a semicircle remote from its path around counterbalancing element 124 until it reaches torsion bar 126. By means of power supply 142a, therefore, the upper (in the view of FIG. 4) portion of counterbalancing element 124 and the lower portion of mirror 122 can be simultaneously charged.

Electrode 144b of power supply 142b is arranged in a complementary fashion so that the lower (in the view of FIG. 4) portion of counterbalancing element 124 and upper portion of mirror 122 can be simultaneously charged by means of power supply 142b.

In use, power supply 142a and power supply 142b have outputs that are 180° out of phase. The output of power supply 142a is essentially sinusoidal between a maximum negative value and 0, while that of power supply 142b is positive and sinusoidal, between a (lesser) maximum positive value and 0.

A reference electrode (not shown) is provided behind mirror 122 and counterbalancing element 124, within the frame (also not shown) of the element of this embodiment and the reference electrode is maintained with a charge, either +ve or −ve.

When power supplies 142a and 142b apply the above described voltages across respective electrodes 144a and 144b and the ground electrode, 180° out of phase, the resulting electrostatic forces between the ground electrode and electrodes 144a and 144b cause the mirror 122 and counterbalancing element 124 to pivot in an oscillatory fashion about torsion bar 126, simultaneously but 180° out of phase, so that uncoupled forces are minimized.

Figure 5:
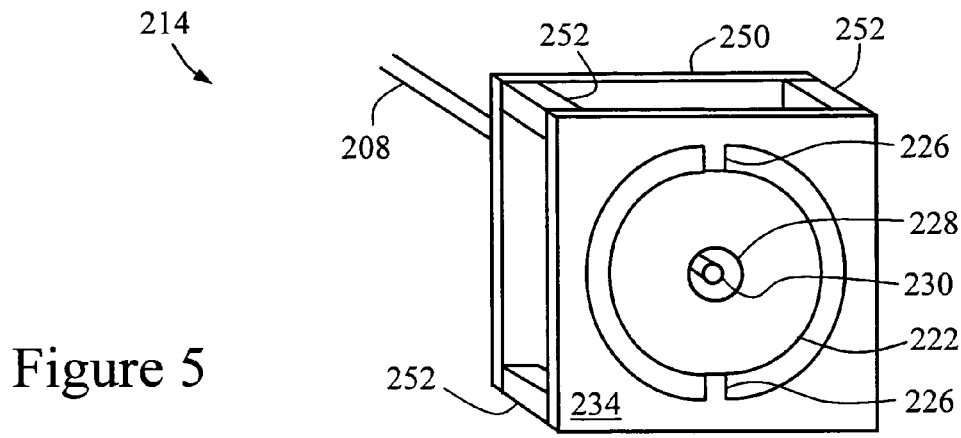
FIG. 5 is a view, similar to that of FIG. 2, of a light scanning element according to a third embodiment of the present invention.
Figure 6:
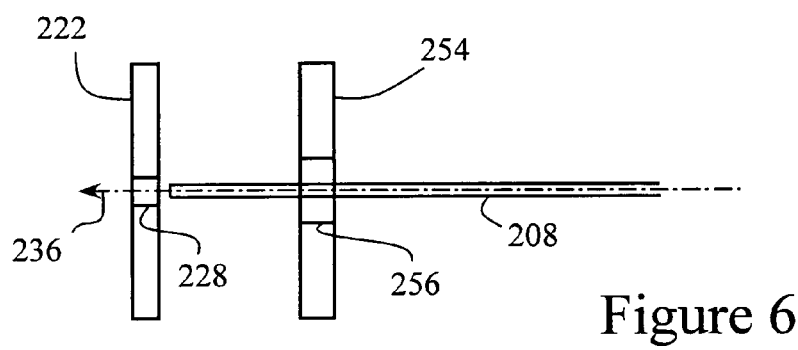
FIG. 6 is a partial cross-sectional view of the scanning element of FIG. 5.

FIG. 5 is an exploded, schematic view of the scanning element 214 of a third embodiment of the present invention. The scanning element 214 includes a forward frame 234, including a mirror 222 pivotably mounted on a torsion bar 226. Mirror 222 includes a circular, central aperture 228. Optical fiber 208 is arranged with its exit tip 230 behind (in the view of FIG. 5) and aligned with central aperture 228. Light from optical fiber 208 is emitted through central aperture 228 in direction 236 (as shown in FIG. 6).

Mirror 222 is driven in an oscillatory or swinging manner by means of an electrostatic or electromagnetic drive (see above).

Scanning element 214 also includes a rear frame 250, mechanically coupled to forward frame 234 by means of four corner pillars 252.

Rear frame 250 is, in most respects, similar with forward frame 234. However, instead of having a pivotable mirror, rear frame 250 includes a similarly arranged pivotable circular counterbalance mounted on a torsion bar. The scanning element 214 is configured, however, so that the counterbalancing element of rear frame 250 is driven 180° out of phase with mirror 222.

The configuration of the pivotable elements (i.e. mirror 250 and counterbalance) is shown more clearly in partial cross section FIG. 6, in which it can be seen that, located behind pivotable mirror 222, is pivotable counterbalance 254. Counterbalance 254 has a circular, central aperture 256, coaxial with central aperture 228 of mirror 222. Central aperture 256 of counterbalance 254 has a greater diameter than does central aperture 228 of mirror 222, because optical fiber 208 passes through central aperture 256 of counterbalance 254, while merely terminating behind central aperture 228 of mirror 222. Central aperture 256 of counterbalance 254 has a sufficiently large diameter that counterbalance 254 can pivot as required without making contact with optical fiber 208.

Figure 7:
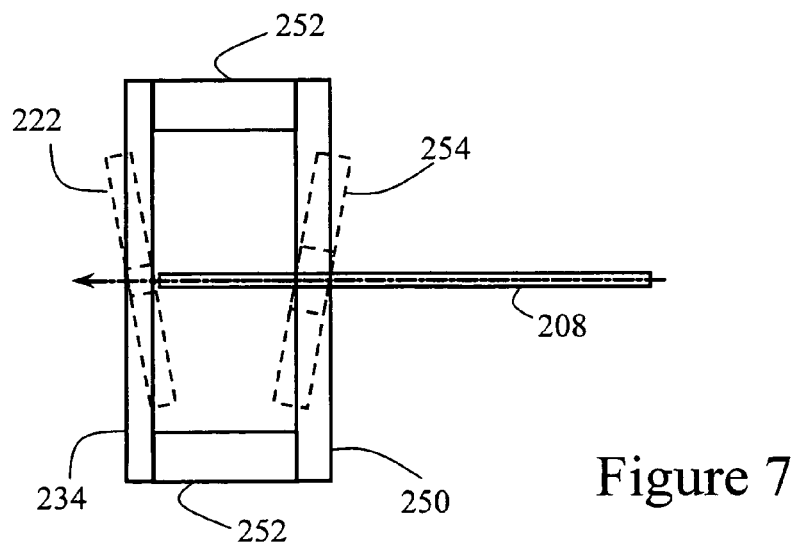
FIG. 7 is a partial cross-sectional view of the scanning element of FIG. 5 in use.

Referring to FIG. 7, which is a side cross sectional view similar to FIG. 6, in use, mirror 222 and counterbalance 254 are driven 180° out of phase, to minimize the transmission of uncoupled forces to other components.

In this embodiment, the scanning element 214 is preferably provided with an electrostatic drive comparable to that shown in FIG. 4, but with the ground electrode located between mirror 222 and counterbalance 250. The placement of the electrodes is adjusted accordingly.

In each of the above embodiments, the preferred technique for manufacturing the counterbalance (comprising one or more counterbalancing elements), so that it as closely as possible balances the mirror includes the following steps.

The counterbalance is initially manufactured heavier than necessary, and tuned by the progressive laser ablation of the counterbalance until it is found to accurately counterbalance the mirror. This is assessed by mounting the scanning element on three piezo-sensors, and driving the scanning element while measuring the signal from the piezo-sensors. Uncoupled forces in the scanning element can then be detected by the piezo-sensors, and the counterbalance progressively laser ablated until no (or negligible) output is detected from the piezo-sensors.

This tuning process can also be performed in a reduced atmosphere, to more precisely simulate the ultimate, preferred operating conditions.

If the counterbalance is metallic, a readily ablated coating can be applied so that tuning comprises the laser ablation of the coating, rather than the counterbalance itself. Alternatively, in such embodiments the coating could be applied to the mirror or other counterbalanced element, and that coating ablated.

Modifications within the spirit and scope of the invention may be readily effected by those skilled in the art. It is to be understood, therefore, that this invention is not limited to the particular embodiments described by way of example hereinabove.

Further, any reference herein to prior art is not intended to imply that that prior art forms or formed a part of the common general knowledge.

The claims defining the invention are as follows:

1. A light scanning device for scanning light from a light source, said light scanning device comprising:
   a pivotably mounted mirror for receiving light from said light source;
   a counterbalance;
   a drive for oscillatorily pivoting said mirror and said counterbalance simultaneously in opposite directions to reduce uncoupled forces;
   a torsion bar rigidly connected to and supporting said mirror; and
   a mount rigidly connected to and supporting said torsion bar;
   wherein said mirror is pivotably mounted on said mount with said torsion bar.

2. A light scanning device as claimed in claim 1, wherein said torsion bar comprises a filament.

3. A light scanning device as claimed in claim 1, wherein said counterbalance is permanently mechanically coupled to said mirror.

4. A light scanning device as claimed in claim 3, wherein said torsion bar supports said mirror and said counterbalance, and wherein said drive drives said counterbalance by driving said mirror and thereby said mechanically coupled counterbalance.

5. A light scanning device as claimed in claim 1, wherein said mirror and said counterbalance are coupled electrostatically or electromagnetically.

6. A light scanning device as claimed in claim 1, wherein said counterbalance comprises an annular structure locatable around said mirror.

7. A light scanning device as claimed in claim 1, wherein said counterbalance comprises a plurality of counterbalancing elements.

8. A light scanning device as claimed in claim 7, wherein said counterbalance comprises two counterbalancing elements, located at opposite sides of said mirror.

9. A light scanning device as claimed in claim 1, wherein said drive is an electrostatic drive.

10. A light scanning device as claimed in claim 1, wherein said drive is an electromagnetic drive.

11. A light scanning device as claimed in claim 1, wherein said mirror and said counterbalance are located, respectively, on first and second supports, wherein said counterbalance is located behind said mirror and thereby does not obscure the light receiving face of said mirror, and said first and second supports are not mutually coaxial.

12. A light scanning device as claimed in claim 1, having a housing with an interior at a pressure lower than atmospheric pressure so that said mirror and said counterbalance operate in said interior in pressure lower than atmospheric pressure.

13. A method of scanning light, comprising:
    reflecting said light from a mirror rigidly connected to and supported by a torsion bar;
    supporting said torsion bar with a mount rigidly connected thereto, whereby said mirror is pivotably mounted on said mount with said torsion bar;
    driving said mirror so as to oscillatorily pivot said mirror and thereby scan said light reflected from said mirror; and
    driving a counterbalance to act as a counterbalance to said mirror;
    whereby uncoupled forces due to said pivoting of said mirror are reduced by means of said counterbalance.

14. A scanning microscope or endoscope including the light scanning device of claim 1.

15. A scanning microscope or endoscope as claimed in claim 14, including one or more optical fibers for transmitting incident light to said microscope or endoscope, for transmitting return light from a sample, or for both transmitting incident light to said microscope or endoscope and for transmitting return light from a sample.

16. A scanning microscope or endoscope as claimed in claim 14, wherein said microscope or endoscope is a confocal microscope or endoscope.

17. A method of balancing the light scanning device of claim 1, said method comprising:
mounting said mirror and counterbalance on one or more sensors for detecting vibration in said device in one or more dimensions;
operating said device and monitoring by means of said sensors any vibration therein; and
adjusting said device so as to reduce any vibration therein.

18. A method as claimed in claim 17, wherein said adjusting of said device comprises ablating a portion of said counterbalance or a portion of said mirror, or ablating portions of both said counterbalance and said mirror.

19. A method as claimed in claim 18, wherein said ablating is laser ablating.

20. A method as claimed in claim 18, wherein said ablating is performed under a pressure lower than atmospheric pressure.

21. A light scanning device for scanning light from a light source, said light scanning device comprising:
a pivotably mounted mirror for receiving light from said light source;
a counterbalance;
a drive for oscillatorily pivoting said mirror and said counterbalance simultaneously in opposite directions to reduce uncoupled forces; and
a torsion bar comprising a filament rigidly connected to and supporting said mirror; and
a mount rigidly connected to and supporting said torsion bar;
wherein said mirror is pivotably mounted on said mount with said torsion bar and said counterbalance is permanently mechanically coupled to said mirror.

22. A light scanning device for scanning light from a light source, said light scanning device comprising:
a pivotably mounted mirror for receiving light from said light source, said mirror having a reflective light receiving face;
a counterbalance;
a drive for oscillatorily pivoting said mirror and said counterbalance simultaneously in opposite directions to reduce uncoupled forces; and
a mount;
wherein said mirror and said counterbalance are located, respectively, on first and second supports, said first and second supports are rigidly connected to and supported by said mount, said mirror is pivotably mounted on said mount with said first support, said counterbalance is located behind said mirror so as not to obscure said light receiving face of said mirror, and said first and second supports are not mutually coaxial.

* * * * *